April 7, 1925.
T. MEAD
ARTIFICIAL BAIT
Filed March 8, 1924
1,533,022
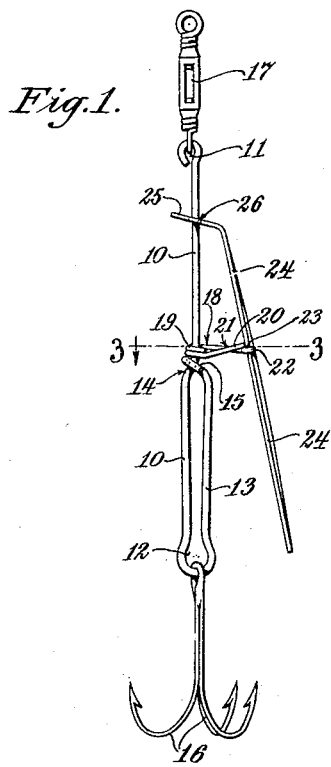
Fig.1.
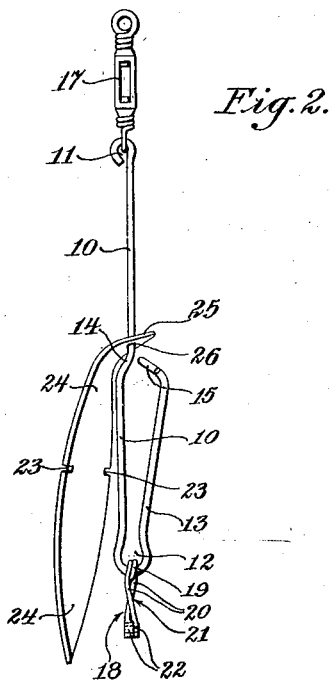
Fig.2.
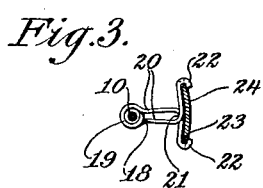
Fig.3.
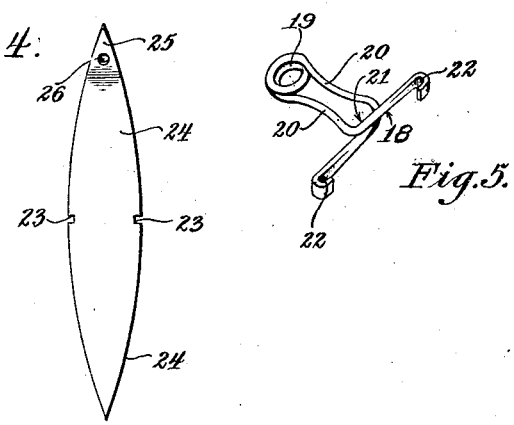
Fig.4.
Fig.5.
Thaddeus Mead
INVENTOR
BY Victor J. Evans
ATTORNEY
Lynn Brodton
WITNESS:

Patented Apr. 7, 1925.

1,533,022

UNITED STATES PATENT OFFICE.

THADDEUS MEAD, OF NEW HAVEN, CONNECTICUT.

ARTIFICIAL BAIT.

Application filed March 8, 1924. Serial No. 697,802.

*To all whom it may concern:*

Be it known that I, THADDEUS MEAD, a citizen of the United States, residing at New Haven, in the county of New Haven and State of Connecticut, have invented new and useful Improvements in Artificial Bait, of which the following is a specification.

This invention relates to improvements in artificial bait and more particularly to a spinner or trolling spoon for fishing purposes.

The principal object of the invention is the provision of a spinner wherein the spinner plate or spoon may be removed without detaching the line therefrom.

Another object of the invention is to provide a device of the type mentioned which will permit the quick removal or application of the spinner plate when it is desired to change the same, it being understood that various fishes will only "strike" a spinner plate of a particular color and which necessitates frequent changes of the spinner plate.

A further object of the invention is to provide a spinner plate of Monel metal which will give a white effect when a white spinner is desired, and of copper when a red spinner is desired.

With these and other objects in view, the invention resides in certain novel construction and combination and arrangement of parts, the essential features of which are hereinafter fully described, are particularly pointed out in the appended claims, and are illustrated in the accompanying drawing, in which:—

Figure 1 is a side elevation of my improved spinner showing the same assembled for use.

Figure 2 is a similar view but showing the manner of removing or applying the spinner-plate.

Figure 3 is a horizontal sectional view on the line 3—3 of Figure 1.

Figure 4 is a plan view of the spinner-plate.

Figure 5 is a detail perspective view of the spring clip.

Referring more particularly to the drawing, the reference numeral 10 designates a stem formed of a single piece of material and having one of its ends bent to form an eye 11, the other end being bent upon itself to form an eye 12 and a relatively short arm 13. The stem is offset as at 14 for co-action with a hook 15 formed on the free end of the arm 13 whereby to hold the arm locked to the stem. A fish hook 16 is supported from the eye 12 and a swivel 17 has connection with the eye 11, the fishing line in turn being connected with the swivel as will be readily understood.

A spring clip or support 18 is insertible on the stem 11, and is formed of a single piece of wire, coiled to form an eye 19 for the reception of the stem 10. Spring pressed legs 20 extend from the eye 19 and cross each other as at 21, the free ends being bent upon themselves to form hooks 22. The hooks 22 co-act with the notches 23 formed in the side edges of a spinner-plate or spoon 24 whereby to hold the spinner-plate spaced from the stem 10 as clearly shown in Figure 1 of the drawing. One end of the spinner-plate is bent to form a nose 25, the said nose being provided with an opening 26 therein for sliding movement on the stem 10.

When removing the spinner plate from the stem, the arm 13 is released from engagement with the stem as shown in Figure 2 and the fish hook 16 removed. The spring-clip is then disengaged from the spinner plate by bringing the legs out of engagement with the notches 23 and is likewise removed, after which the spinner plate is withdrawn. Should a different color plate be desired, the same may be applied to the same spring clip used for the other plate and the parts assembled in a manner reversed to that just described.

The spinner plates which I contemplate using in connection with my improved artificial bait, are of two different colors, one spinner is formed of Monel metal highly polished to give a white lustre and the second plate made of copper which may be buffed to give a red effect. These spinners are interchangeable on the stem 10 and are to be used when trolling for different species of fish as certain fish will only strike a particular color of spinner.

When the artificial bait herein described is drawn through the water in the customary manner, the spinner-plate will rotate on the stem at a high rate of speed as there is very little friction between the eye 19 of the clip and the stem 10, and between the walls of the opening 26 and the stem. These parts are so arranged whereby to balance the spinner plate to obtain the maximum result.

While I have described what I deem to be the most desirable embodiment of my invention, it is obvious that many of the details may be varied without in any way departing from the spirit of my invention, and I therefore do not limit myself to the exact details of construction herein set forth nor to anything less than the whole of my invention limited only by the appended claims.

What is claimed as new is:—

1. A device of the class described comprising a stem having an eye at one end thereof, means at the opposite end to detachably engage the stem and form a second eye, a spinner plate mounted for rotation on said stem, a clip rotatable on said stem, and co-acting means on said clip and spinner plate for holding the body of said spinner plate spaced from said stem, said co-acting means including spring pressed hooks on said clip for reception in notches formed in the sides of said spinner plate.

2. In combination with a stem having an eye at one end, means at the opposite end to detachably engage the stem and form a second eye, a spinner plate on said stem for rotation thereon, a member having an eye insertible on said stem, spring pressed legs formed on said member, and means on the ends of said legs for clamping engagement with the sides of the spinner plate as and for the purpose specified.

In testimony whereof I have affixed my signature.

THADDEUS MEAD.